United States Patent [19]
Carlson

[11] 3,739,180
[45] June 12, 1973

[54] PARTICLE SIZE DISTRIBUTION ANALYSIS

[75] Inventor: John T. Martin Carlson, Edina, Minn.

[73] Assignee: Terryl K. Qualey, St. Paul, Minn., part interest

[22] Filed: Sept. 28, 1970

[21] Appl. No.: 76,058

[52] U.S. Cl............... 250/218, 73/28, 73/432 PS, 250/222 PS, 356/102, 356/201
[51] Int. Cl. ............................................ G01n 21/26
[58] Field of Search..................... 250/218, 222 PC; 356/102–104, 207–208, 201; 73/28, 432 PS; 209/1, 134–137, 143, 157, 208; 235/92 PC; 324/71 PC

[56] References Cited
UNITED STATES PATENTS

| | | | |
|---|---|---|---|
| 2,926,783 | 3/1960 | McGinn................... | 73/432 PS X |
| 3,478,597 | 11/1969 | Merigold et al.......... | 73/432 PS UX |
| 2,838,378 | 6/1958 | Shawhan................. | 324/30 |
| 2,379,158 | 6/1945 | Kalischer................ | 250/218 X |
| 2,819,608 | 1/1958 | McLaren et al. ......... | 250/218 UX |
| 3,074,627 | 1/1963 | Goetz..................... | 73/432 PS UX |
| 3,444,464 | 5/1969 | Coulter et al............ | 324/71 |
| 3,462,683 | 8/1969 | Onna...................... | 324/71 X |
| 3,519,353 | 7/1970 | Franz et al............... | 250/218 X |

Primary Examiner—Ronald L. Wibert
Assistant Examiner—F. L. Evans
Attorney—Terryl K. Qualey

[57] ABSTRACT

Apparatus and method for analyzing the size distribution of particles of similar density generally uniformly carried in a flow stream in a first section and segregated in the flow stream in a second section by forces acting on the particles according to their respective volumes in which the concentration by volume of all solids carried in the flow stream in the first section is measured, the concentration by volume of solids carried in the flow stream in the second section is measured at least at one predetermined position and the measurement made in the second section is divided by that made in the first section.

18 Claims, 4 Drawing Figures

Patented June 12, 1973

INVENTOR.
JOHN T. MARTIN CARLSON
BY
Terryl K. Qualey
ATTORNEY

PARTICLE SIZE DISTRIBUTION ANALYSIS

This invention relates to a particle size analyzer for determining the size distribution of particles carried in a flow stream.

Prior art devices for determining the size distribution of particles in a flow stream have generally relied upon taking discontinuous samples of the flow stream and placing the samples in a settling tank to determine the distribution of each sample. The gravitational, inertial and viscous forces acting on and, therefore, the terminal velocity of a particle falling through a real fluid is related in different ways to the volume of the particle. Stoke's Law describes the descent of particles where the flow about the particle is characterized by a high ratio of viscous to inertial forces. According to Stoke's Law, the rate of descent of particles of the same density through a real fluid under the influence of gravity is directly related to their respective volumes. The weight of a particle increases more rapidly with increased diameter than does its surface area. Thus, the viscous force of the fluid has a greater effect on a smaller particle and, therefore, a smaller particle has a lower terminal velocity in and takes longer to descend through a real fluid. Due to this effect, stratification according to particle volume occurs in a settling chamber. However, the use of a settling chamber has been disadvantageous in that the measurement is necessarily discontinuous since the sample must be extracted from the flow stream and taken to a measurement station. Furthermore, this method is time consuming and, therefore, highly disadvantageous where the content of a flow stream is rapidly changing.

Continuous analysis of the size distribution of particles carried in a flow stream generally requires stratification or segregation of the particles in the flow stream according to their volumes. Such segregation can be provided by gravitational, centrifugal or, in appropriate cases, magnetic forces upon the particles. Measurement of the concentration of solids across a portion of the flow stream will then indicate the concentration profile of the particles in a predetermined size range carried in the flow stream, as disclosed in U.S. Pat. No. 3,505,519. However, such measurements do not provide a particle size distribution as a percentage of the total weight of particles carried in the flow stream prior to segregation as is desired in most applications.

The present invention provides an apparatus and method for continuously analyzing the size distribution, as a percentage of the total weight of particles, of particles of similar density generally uniformly carried in a flow stream in a first section and segregated in the flow stream in a second section by forces acting on the particles according to their respective volumes. The concentration by volume of all solids carried in the flow stream is measured in the first section, the concentration by volume of solids carried in the flow stream is measured at least at one predetermined position in the second section and the measurement made in the second section is divided by that made in the first section to provide the percentage by weight of particles having volumes less than a predetermined volume.

The novel features and advantages will become apparent after reading the following description which refers to the accompanying drawings wherein.

Figure 1:
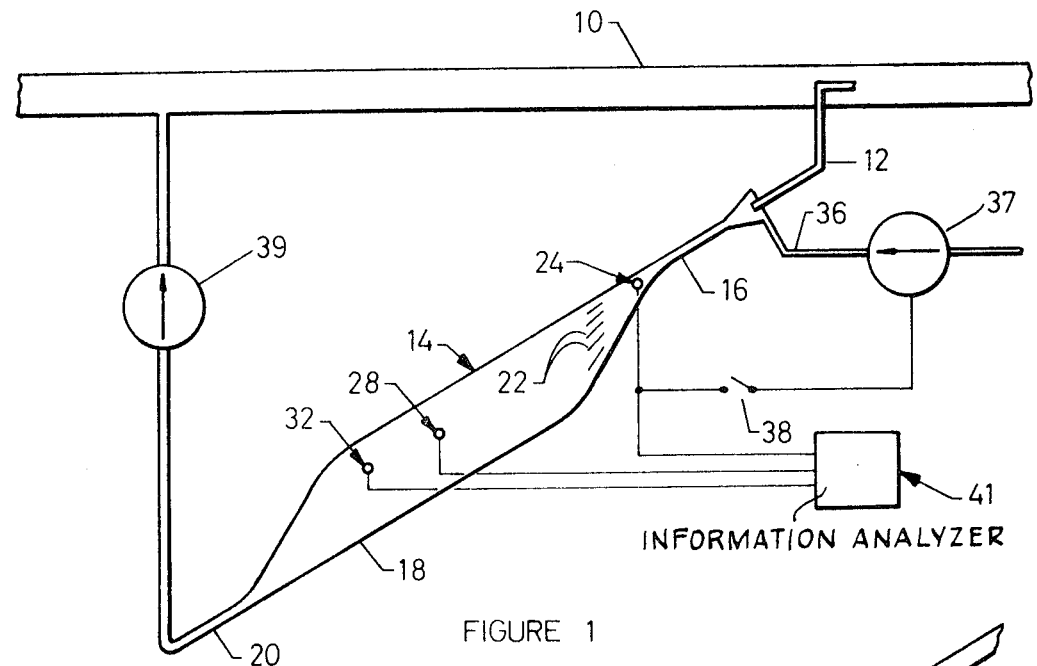
FIG. 1 is a schematic elevational view of a particle size analyzer constructed in accordance with the present invention.

Referring now to the drawings, there is illustrated a particle size analyzer made in accordance with the present invention. In the illustrated embodiment a horizontal pipe 10 carries a particle laden flow stream which it is desired to analyze. It is contemplated that this pipe 10 may be the main flow carrying pipe between steps in a process in which particles having similar densities, for example taconite particles or coal particles, are reduced in size to provide some optimum size distribution. In the illustrated structural arrangement the flow stream carried in the pipe 10 is moving from right to left as viewed in FIG. 1.

A sampling pipe 12 having a diameter substantially less than that of the main flow pipe 10 extends through the wall of the main flow pipe 10 and is formed with a bend to position its terminal end generally coaxially with the main flow pipe 10 with its opening positioned to continuously receive a representative sample of the particle laden flow stream. The opposite end of the sampling pipe 12 extends into one end of an inclined flow chamber 14 to feed the sample of the particle laden flow stream thereto.

Figure 2:
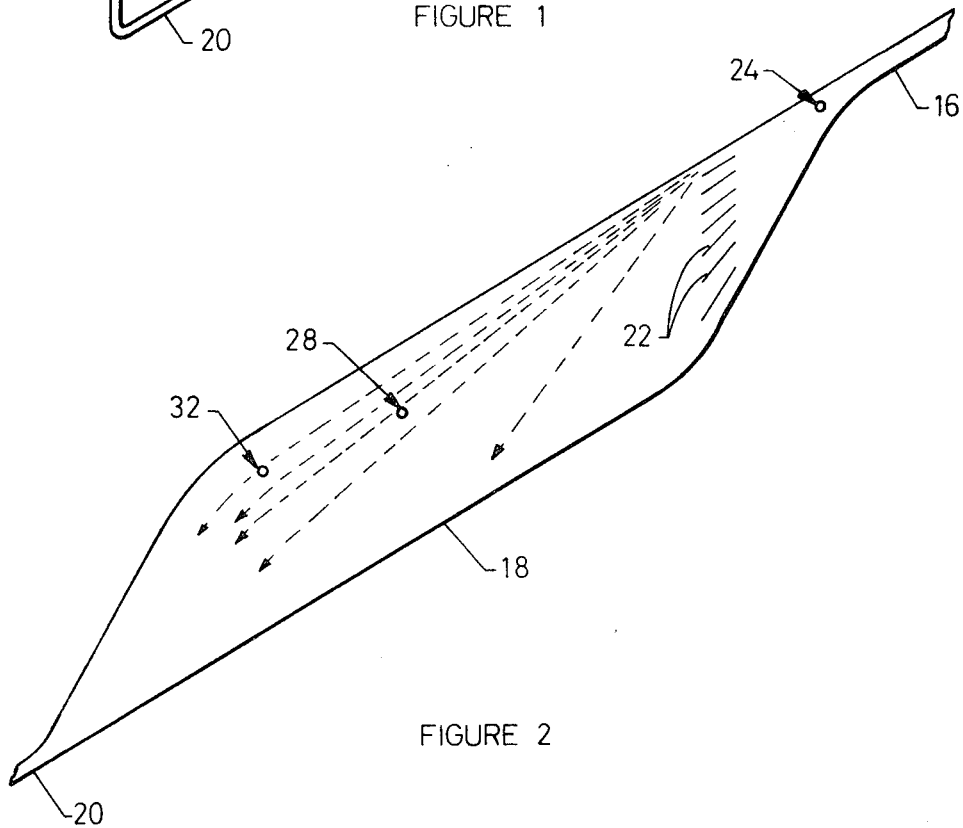
FIG. 2 is a schematic elevational view of one part of the apparatus of FIG. 1.
Figure 3:
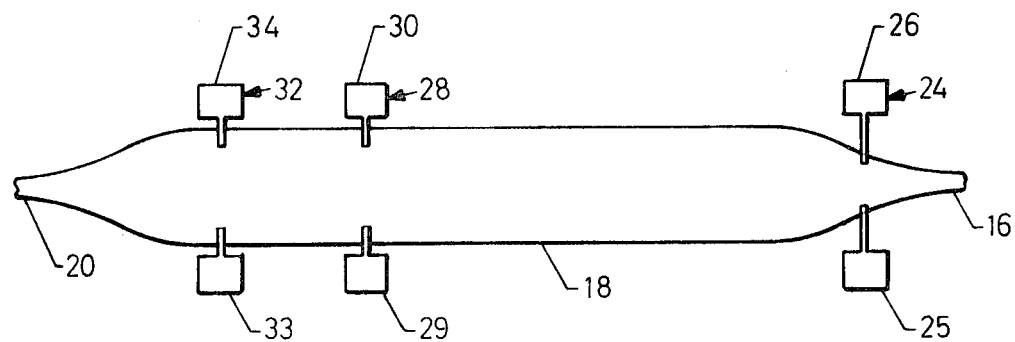
FIG. 3 is a schematic top view of the part illustrated in FIG. 2.

In the illustrated embodiment the flow chamber 14 comprises a generally cylindrical reduced area mixing section 16 at its inlet, a substantially larger and generally rectangular laminar flow measuring section 18 and a generally cylindrical reduced area outlet 20. The preferred embodiment relies upon gravity to segregate the particles according to size in the laminar flow measuring section 18 and it is, therefore, necessary that the fluid of the flow stream have a density different than that of the particles and that the flow moving through the laminar flow measuring section 18 have a horizontal flow component to permit vertical segregation of the particles. Particles having the same volume and a density greater than that of the flow stream fluid move in the laminar flow measuring section 18 in generally parallel paths until they settle to the bottom of the flow chamber 14. Thus, the concentration by volume of particles having a predetermined volume will be constant in a volume of the laminar flow measuring section 18 bounded by the trajectory of particles having the predetermined volume which enter adjacent the upper wall of the flow chamber 14 and by the lower wall of the flow chamber. By computing the path along which particles having a predetermined volume and entering the flow chamber 14 adjacent the upper wall thereof travel in the laminar flow measuring section 18, a boundary surface is defined above which measurements of the concentration by volume of particles remaining in the sample will exclude particles equal to or greater than the predetermined volume. Particles in the sample with volumes less than the predetermined volume will cross any point on the defined boundary surface in proportion to their respective concentrations by volume. Thus, a measurement of the concentration by volume of solids made at any point along the boundary surface will indicate the concentration of particles in the flow stream prior to segregation having volumes less than the predetermined volume. The prescribed paths of particles of five discrete volumes entering the flow chamber adjacent the upper wall thereof are indicated in broken lines in FIG. 2.

It is also contemplated by the present invention that the particles may be segregated in the flow stream or in a representative sample thereof by other forces acting upon the particles according to their respective sizes. In appropriate situations segregation may be provided, for example, by centrifugal forces or by magnetic forces upon the particles. Since the preferred embodiment utilizes only gravitational forces upon the particles, the laminar flow measuring section 18 is inclined to the horizontal to aid in moving particles which settle to the bottom of the chamber through the outlet 20.

The flow rate through the chamber 14 and the respective areas of the mixing section 16 and the laminar flow measuring section 18 are adjusted such that there is turbulent flow in the mixing section 16 to uniformly entrain particles in the sample moving through the mixing section 16 and to produce laminar flow in the laminar flow section 18 to permit segregation of the particles according to Stoke's Law. In the transition area between the mixing section 16 and the laminar flow measuring section 18 a plurality of planar flow straighteners 22 extending transverse of the flow chamber 14 are preferably provided to aid in the transition between the mixing section 16 and the laminar flow measuring section 18. As illustrated, the mixing section 16 is preferably provided as a part of the flow chamber 14 to permit regulation of the flow therethrough.

In the illustrated embodiment the mixing section 16 of the flow chamber 14 also serves as a measuring section at which the concentration by volume of all solids carried in the representative sample of the flow stream is measured as will be hereinafter described. It is preferable to provide the turbulent flow measuring section as illustrated to permit control of the flow rate and the concentration of the sample for ease of measurement. However, if the total concentration by volume of solids carried in the flow stream can be measured in the main flow pipe 10 an area within the main flow pipe 10 in juxtaposition to the sampling pipe 12 may serve as the turbulent flow measuring section. In such case the mixing the measuring section 16 in the flow chamber 14 would not be required for the measuring function.

Measurement of the concentration by volume of solids in the representative sample at three predetermined positions in the flow chamber is provided by three photocells 24, 28 and 32, each of which consists of a light source 25, 29 and 33, respectively, and a photosensor 26, 30 and 34, respectively, in alignment to measure light transmissivity transverse of the flow chamber 44. One of the photocells 24 is positioned in the mixing and measuring section 16. The other photocells 28 and 32 are positioned in spaced relation in the laminar flow measuring section 18, each located to measure the concentration by volume of solids having a volume less than a predetermined volume.

In many applications the particle laden flow stream in the main flow pipe 10 will be very dense and may not permit light to be transmitted therethrough. Therefore, it is preferable to provide dilution of the sample while maintaining its representative characteristics. For this reason a dilution pipe 36 is connected to the inlet of the flow chamber 14 to provide fluid of the same type that carries the particles in the main flow pipe 10. An inlet pump 37 is positioned in the diluting pipe 36 to force the diluting fluid into the flow chamber inlet to provide effective mixture of the representative sample and the diluting fluid at the flow chamber inlet. In one preferred embodiment the diluting fluid is fed to the inlet of the flow chamber 14 at a constant rate by the inlet pump 37 to at all times sufficiently dilute the sample to permit light transmissivity measurements by the photocell 24 positioned in the mixing and measuring section 16.

In some applications the total percentage by volume of solids carried in the flow stream may vary over a wide range. In such case it may be desirable to control the particle concentration of the representative sample by selecting a limiting concentration below which the sample will not fall in normal operation and then diluting the sample sufficiently to maintain a constant concentration of solids equal to or less than the limiting concentration. For this reason the inlet pump 37 is preferably driven by a variable speed motor that is responsive to the particle concentration measured by the photocell 24 positioned in the mixing and measuring section 16 to adjust the flow of the diluting fluid to maintain the selected particle concentration of the sample. A switch 38 is provided between the photocell 24 and the motor driving the inlet pump 37 to permit the pump 37 to be set at a constant flow rate when the switch 38 is open and, alternatively, to provide automatic adjustment of the flow rate to maintain a constant particle concentration when the switch 38 is closed. With the switch 38 closed the diluting fluid flow is controlled by the photocell 24 and the mixing and measuring section 16 may also be denoted as a turbulent flow control section.

The flow chamber outlet 20 is preferably connected to the main flow pipe 10 downstream of the sampling pipe 12 and a constant flow rate outlet pump 39 is provided to carefully control the flow rate through the flow chamber 14 and to pump the analyzed sample back into the main flow pipe 10 to produce a closed system. The outlet 20 is provided with a reduced area to produce turbulent flow which will entrain the settled particles to aid in cleaning the flow chamber 14.

Figure 4:
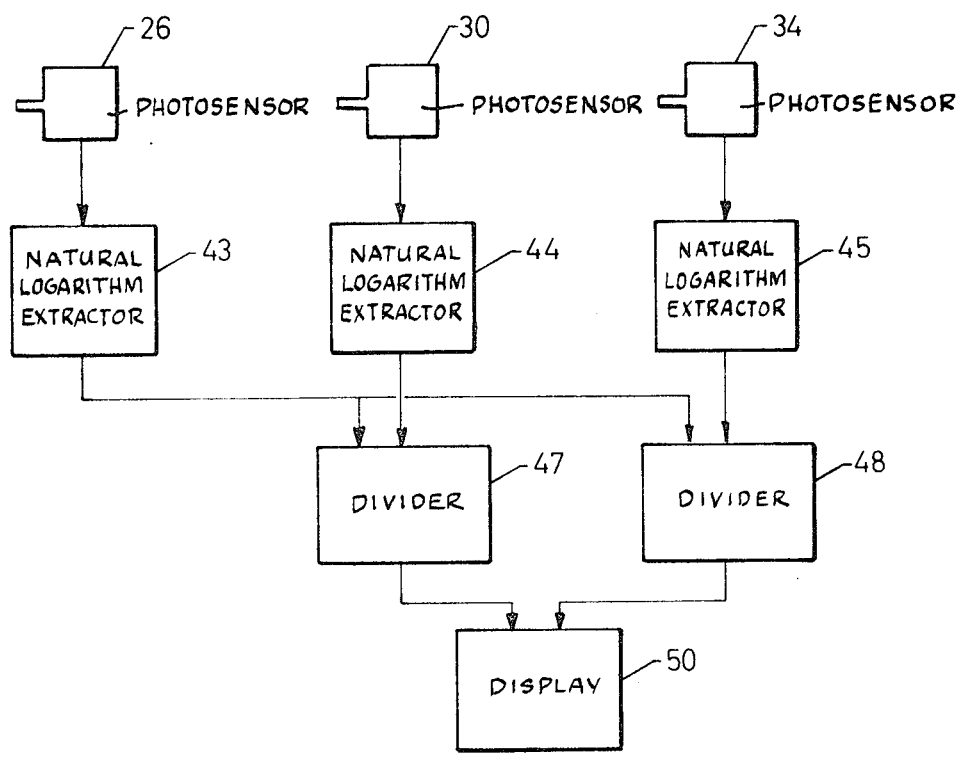
FIG. 4 is a flow diagram of the electrical circuitry schematically illustrated in FIG. 1.

The light sources 25, 29 and 33 of the photocells 24, 28 and 32, respectively, are appropriately driven to give the desired light intensity, and the photosensors 26, 30 and 34 are connected to an information analyzer 41. The information analyzer 41 is illustrated by the flow diagram of FIG. 4. It comprises means for independently amplifying and extracting the natural logarithm of the signals received from each of the photosensors 26, 30 and 34, denoted 43, 44 and 45, respectively; means for dividing the output from the natural logarithm extractors 44 and 45 associated with the photosensors 30 and 34 in the laminar flow measuring section 18 by the signal from the logarithm extractor associated with the photosensor 26 in the measuring and mixing section 16, denoted 47 and 48, respectively; and means for displaying the quotients, denoted 50. The amplifier-logarithm extractors 43, 44 and 45 may be appropriate commercially available transistors having natural logarithmic current-to-voltage relationships and connected to appropriate power sources. Preferably the three transistors are provided in a single module, are closely matched and are thermally coupled to minimize temperature differences between their junctions. Dividers 47 and 48 which provide an instantaneous quotient of two variables are also commercially available, such as from GTS Corporation with offices at Framingham, Mass. The display 50 may take many forms depending on the application. For example, it may comprise a strip chart recorder which produces an independent line graph for outputs from each of the dividers 47 and 48. The outputs from the dividers 47 and 48 may also be the inputs for an automatic process controller.

In the information analyzer 41, a natural logarithm extractor 43, 44 or 45 produces the natural logarithm of the output from a photosensor 26, 30 or 34 which is proportional to the concentration by volume of the particles in the sample. The dividers 47 and 48, therefore, produce the ratio between the concentration by volume of all solids contained in a representative sample of the flow stream and the concentration by volume of solids remaining after the sample has progressed through the laminar flow measuring section 18 to the photocells 28 and 32, respectively. By appropriate placement of a photocell 28 or 32 in the laminar flow measuring section 18 and by knowing the flow rate through the flow chamber 14 a boundary particle size can be computed, particles above which size will not pass through the light beam of the positioned photocell 28 or 32. By dividing the concentration by volume of particles indicated by the positioned photocell 28 or 32 by the total concentration by volume of particles indicated by the photocell 24 in the mixing and measuring section 16, the percentage of the total particle volume in the representative sample consisting of particles smaller than the boundary particle size computed for that photocell 28 or 32 is obtained. The complement of this percentage would, of course, give the percentage of the total particle volume in the representative sample consisting of particles larger than the boundary particle size. Thus, by providing two photocells 28 and 32 in the laminar flow measuring section 18 a two point distribution of particle size can be obtained by knowing the position of each of the photocells and the flow rate through the flow chamber 14.

In one specific mathematical model with water as the fluid, the particles having a density five times that of water and the flowing design parameters:

| | |
|---|---|
| inclination of the laminar flow measuring section | = 30° |
| width of the laminar flow measuring section | = 0.5 feet |
| height of the laminar flow measuring section (perpendicular to flow) | = 0.83 feet |
| radius of the mixing and measuring section | = 0.95 inch |
| average velocity of the fluid through the laminar flow measuring section | = 0.028 feet per second | a position at which a photocell may be located to indicate only particles having a diameter less than 20 microns can be computed by the application of Stoke's Law. In this example the photocell position is found to be 2.83 feet from the beginning of the laminar flow measuring section 18 and 0.25 feet from the upper wall of the flow chamber 14. These design parameters also satisfy the conditions that the flow be turbulent in the mixing section 16 and laminar in the laminar flow measuring section 18. Thus, by dividing the concentration by volume of particles measured in the mixing section 16 into the concentration by volume of particles indicated by the photocell so positioned in the laminar flow measuring section 18 the percentage of particles having a diameter less than 20 microns will be indicated on the display 50.

In use, a representative sample of the flow stream in the main flow pipe 10 will be directed therefrom by the sampling pipe 12 and the sample will be uniformly carried in the flow stream both in the main flow pipe 10 and in the mixing and measuring section 16 of the flow chamber 14. The photocell 24 in the mixing section 16 will measure the concentration by volume of all solids carried in the flow stream. As the sample continues to flow through the chamber 14 it moves through the laminar flow measuring section 18 wherein gravity acts upon the particles to segregate them according to their respective volumes. The photocells 28 and 32 then measure the concentration by volume of particles having sizes smaller than a predetermined volume. The information analyzer 41 divides the measurements made by the photocells 28 and 32 in the laminar flow section 18 by the measurement made by the photocell 24 in the mixing and measuring section 16. The display 50 illustrates the percentage of the total particle volume in the representative sample consisting of particles having sizes less than the two predetermined sizes indicated by the positions of the photocells 28 and 32 to give a two point distribution of particle sizes carried in the flow stream of the main flow pipe 10. The particles settled out of the flow stream and those carried to the outlet 20 are then carried through the outlet pipe 20 by the outlet pump 39 back into the main flow pipe 10.

Having thus described the present invention, What is claimed is:

1. A method for determining the size distribution of particles having similar densities, generally uniformly carried in a flow stream at a first section and segregated in the flow stream at a second section by forces acting on the particles according to their respective volumes, comprising the steps of:

measuring in said first section the concentration by volume of solids carried in the flow stream;

measuring at least at one predetermined position in said second section the concentration by volume of solids carried in the flow stream; and dividing the measurement made in said second section by the measurement made in said first section, whereby the size distribution of the particles carried in the flow stream in said first section is obtained by said step of dividing the measurement made in said second section by the measurement made in said first section.

2. The method of claim 1 wherein said step of measuring in said second section comprises independently measuring the concentration by volume of solids at a plurality of predetermined positions in said second section and said dividing step comprises dividing each of said measurements made in said second section by said measurement made in said first section.

3. A method for determining the size distribution of particles having generally similar densities and carried in a flow stream of a fluid having a density different than that of the particles, comprising the steps of:

directing at least a representative sample of the particle carrying flow stream through a turbulent flow measuring section;

directing at least a representative sample of the particle carrying flow stream through a turbulent flow mixing section and immediately thereafter through a laminar flow measuring section having a horizontal flow component in juxtaposition to the turbulent flow measuring section;

measuring in the turbulent flow measuring section the concentration by volume of solids carried in the flow stream;

measuring at least at one predetermined position in the laminar flow measuring section the concentration by volume of solids carried in the flow stream; and dividing the measurement made in the laminar flow measuring section by the measurement made in the turbulent flow measurement section, whereby the size distribution of the particles carried in the flow stream is obtained by said step of dividing the measurement made in the laminar flow measuring section by the measurement made in the turbulent flow measurement section.

4. The method of claim 3, wherein said step of measuring in the laminar flow measuring section comprises measuring at a plurality of predetermined positions the concentration by volume of solids carried in the flow stream and said dividing step comprises dividing each of said measurements made in the laminar flow measuring section by the measurement made in the turbulent flow measurement section, whereby a distribution of the sizes of the particles carried in the turbulent flow stream is obtained.

5. The method of claim 3, wherein said step of directing at least a representative sample through a turbulent flow measuring section and said step of directing at least a representative sample through a turbulent flow mixing section and immediately thereafter through a laminar flow measuring section comprise the single step of directing at least a representative sample of the particle carrying flow stream through a turbulent flow combination mixing and measuring section and immediately thereafter through a laminar flow measuring section.

6. The method of claim 5 wherein said step of measuring in the laminar flow measuring section comprises measuring at a plurality of predetermined positions the concentration by volume of solids carried in the flow stream and said dividing step comprises dividing each of said measurements made in the laminar flow measuring section by the measurement made in the turbulent flow measuring section, whereby a distribution of the sizes of the particles carried in the turbulent flow stream is obtained.

7. The method of claim 3 including the step of diluting the representative sample that is directed through the turbulent flow mixing section to maintain a constant concentration by volume of solids in the turbulent flow mixing section.

8. The method of claim 7 including the steps of moving a representative sample of the particle carrying flow stream through a turbulent flow control section in juxtaposition to the turbulent flow mixing secton, measuring in the turbulent flow control section the concentration by volume of solids carried in the flow stream, and controlling said step of diluting the representative sample in response to the measurement made in the control section.

9. The method of claim 8 wherein said step of measuring in the laminar flow measuring section comprises measuring at a plurality of predetermined positions the concentration by volume of solids carried in the flow stream and said dividing step comprises dividing each of said measurements made in the laminar flow measuring section by the measurement made in the turbulent flow measuring section, whereby a distribution of the sizes of the particles carried in the turbulent flow stream is obtained.

10. Apparatus for determining the size distribution of particles having similar densities, generally uniformly carried in a flow stream in a first section and segregated in the flow stream in a second section by forces acting on the particles according to their respective volumes, comprising:

means for measuring in said first section the concentration by volume of solids carried in the flow stream;

means for measuring at least at one predetermined position in said second section the concentration by volume of solids carried in the flow stream; and means for dividing the measurement made in said second section by the measurement made in said first section, whereby the size distribution of the particles carried in the flow stream in said first section is obtained by division of the measurement made in said second section by the measurement made in said first section.

11. The apparatus of claim 10 wherein said means for measuring in said second section comprises means for independently measuring the concentration by volume of solids at a plurality of predetermined positions in said second section and said means for dividing comprises means for dividing each of said measurements made in said second section by the measurement made in said first location.

12. Apparatus for determining the size distribution of particles having generally similar densities and carried in a flow stream of a fluid having a density different than that of the particles, comprising:

means defining a turbulent flow measuring section through which at least a representative sample of the particle carrying flow stream may be directed;

means defining a turbulent flow mixing section and immediately thereafter a laminar flow measuring section in juxtaposition to said turbulent flow measuring section through which at least a representative sample of the particle carrying flow stream may be directed;

means for measuring in said turbulent flow measuring section the concentration by volume of solids carried in the flow stream;

means for measuring at least at one predetermined position in said laminar flow measuring section the concentration by volume of solids carried in the flow stream; and means for dividing the measurement made in said laminar flow measuring section by the measurement made in said turbulent flow measuring section, whereby the size distribution of the particles carried in the flow stream is obtained by division of the measurement made in said laminar flow measuring section by the measurement made in said turbulent flow measuring section.

13. Apparatus as recited in claim 12 wherein said means for measuring in said laminar flow measuring section comprises means for measuring the concentration by volume of solids carried in the flow stream at a plurality of predetermined positions in said laminar flow measuring section and said means for dividing measurements comprises means for independently dividing measurements made at each of said positions in said laminar flow measuring section by the measurement made in said turbulent flow measuring section, whereby a distribution of the sizes of the particles carried in the turbulent flow stream may be obtained.

14. The apparatus of claim 12 wherein said means defining a turbulent flow measuring section and said means defining a turbulent flow mixing section comprise means defining a combined turbulent flow measuring and mixing section immediately prior to said laminar flow measuring section.

15. The apparatus of claim 14 wherein said means for measuring in said laminar flow section comprises means for measuring the concentration by volume of solids carried in the flow stream at a plurality of predetermined positions in said laminar flow measuring section and said means for dividing measurements comprises means for independently dividing measurements made at each of said positions in said laminar flow measuring section by the measurement made in said turbulent flow measuring section, whereby a distribution of the sizes of the particles carried in the turbulent flow stream may be obtained.

16. The apparatus of claim 12 including means for diluting a representative sample that is directed through said turbulent flow mixing section to maintain a constant concentration by volume of solids in the turbulent flow mixing section.

17. The apparatus of claim 16 including means defining a turbulent flow control section through which a representative sample of the particle carrying flow stream may be directed, means for measuring in the turbulent flow control section the concentration by volume of solids carried in the flow stream, and means for controlling said means for diluting the representative sample in response to measurements made in said control section.

18. The apparatus of claim 17 wherein said means for measuring in said laminar flow measuring section comprises means for measuring the concentration by volume of solids carried in the flow stream at a plurality of predetermined positions in said laminar flow measuring section and said means for dividing measurements comprises means for independently dividing measurements made at each of said position in said laminar flow measuring section by the measurement made in said turbulent flow measuring section, whereby a distribution of the sizes of the particles carried in the turbulent flow stream may be obtained.

* * * * *